US007092956B2

(12) United States Patent
Ruediger

(10) Patent No.: US 7,092,956 B2
(45) Date of Patent: Aug. 15, 2006

(54) DEDUPLICATION SYSTEM

(75) Inventor: Thomas Ruediger, Cologne (DE)

(73) Assignee: General Electric Capital Corporation, Stamford, CT (US)

( * ) Notice: Subject to any disclaimer, the term of this patent is extended or adjusted under 35 U.S.C. 154(b) by 502 days.

(21) Appl. No.: 10/000,271

(22) Filed: Nov. 2, 2001

(65) Prior Publication Data

US 2003/0097359 A1 May 22, 2003

(51) Int. Cl.
*G06F 17/30* (2006.01)

(52) U.S. Cl. .............................. 707/101; 707/6; 707/7; 707/102; 707/103 R; 707/104.1

(58) Field of Classification Search ................ 707/1, 707/6, 7, 101, 102, 10, 2, 3, 103 R, 104.1; 711/216; 706/47; 709/200
See application file for complete search history.

(56) References Cited

U.S. PATENT DOCUMENTS

| | | | | | |
|---|---|---|---|---|---|
| 5,675,785 | A | * | 10/1997 | Hall et al. ................... | 707/102 |
| 5,680,611 | A | * | 10/1997 | Rail et al. .................... | 707/101 |
| 5,799,302 | A | * | 8/1998 | Johnson et al. ................ | 707/7 |
| 5,848,405 | A | * | 12/1998 | Norcott ......................... | 707/1 |
| 5,974,441 | A | * | 10/1999 | Rogers et al. ............. | 709/200 |
| 5,999,936 | A | * | 12/1999 | Pattison et al. ............. | 707/101 |
| 6,167,405 | A | * | 12/2000 | Rosensteel et al. ......... | 707/102 |
| 6,292,880 | B1 | * | 9/2001 | Mattis et al. ................ | 711/216 |
| 6,397,214 | B1 | * | 5/2002 | Rogers ........................... | 707/6 |
| 6,430,545 | B1 | * | 8/2002 | Honarvar et al. ............. | 706/47 |
| 6,457,006 | B1 | * | 9/2002 | Gruenwald .................... | 707/7 |
| 6,651,055 | B1 | * | 11/2003 | Kilmer et al. ................. | 707/3 |
| 2002/0087516 | A1 | * | 7/2002 | Cras et al. ..................... | 707/2 |

OTHER PUBLICATIONS

Saroia et al., "Production Datawarehouse and Software Toolset to support Productivity Improvement Activities", IEEE, 1999, pp. 183-187.*
Bhowmick et al., "Cost-benefit analysis of Web bag in a Web warehouse", IEEE, 1999, pp. 1-9.*

(Continued)

*Primary Examiner*—Thuy N. Pardo
(74) *Attorney, Agent, or Firm*—Buckley, Maschoff & Talwalkar LLC

(57) ABSTRACT

A system to load data in a data warehouse includes reception of a plurality of records, determination, for each of the plurality of records, of values representing differences between a record and each other of the plurality of records, identification of at least two of the plurality records as duplicates based on a determined value representing a difference between the two records, and storage of the two records in the data warehouse in association with a same identifier. Determination of the values may include determination, for each of a first plurality of data fields of the record, of a first value representing a difference between data specified in the data field and data specified in a respective one of a second plurality of data fields of one of the other of the plurality of records, determination, for each of the second plurality of data fields, of a second value representing a difference between data specified in the data field and data specified in a respective one of the first plurality of data fields, and determination of a third value representing a difference between the record and the one of the other of the plurality of records based on the determined first and second values.

13 Claims, 18 Drawing Sheets

OTHER PUBLICATIONS

SmartSoft Datatech, "Match IT Database Deduplication and Merge Purge Software", http://www.smartsoftusa.com/matchit.html (download Nov. 2, 2001) 3 pgs.

TrueData International, "TrueData International specialists in Data Management and database deduplication software", http://www.truedata.co.uk/products.htm (download Sep. 13, 2001) 3 pgs.

DataFlux—"Case Studies: Eliminating Redundance", © 2001 DataFlux Corporation, http://www.dataflux.com/customers/redundancy.asp (download Nov. 1, 2001) 2pgs.

Batec "Dedupe", http://www.batec.com/dedup/dedup.html (download Nov. 1, 2001) 2pgs.

* cited by examiner

| RECORD NUMBER 401 | FIRST NAME 402 | SURNAME 403 | ZIP 404 | CITY 405 | STREET 406 | HOUSE NUMBER 407 | BIRTHDATE 408 |
|---|---|---|---|---|---|---|---|
| 035 | MICKEY | MOUSE | 00000 | ANAHEIM | MAIN | 123 | 0/0/00 |
| HJ2 | JOHN | SMITH | 06420 | NEW TOWN | ELM | 111 | 6/4/60 |
| 9400 | J. | SMITH | 06420 | NEW | ELM | 111 | 6/4/60 |
| 01101 | KATHY | JONES | 99013 | OLD TOWN | CENTER | 222 | |
| 01110 | KATHLEEN | JONES | 99013 | OLD TOWN | CENTER | 222 | |
| 3Z-27K | JACK | SMITH | 06420 | NEWTOWN | ELM | 111 | 6/4/60 |
| 849-3SBD | | | | | | | |
| 3 | JOHN | SMITH | 06420 | NEW TOWN | ELM | 111 | 6/4/60 |
| XYZ | JOHN | SMITH | 06430 | NEW TOWN | ELM | 111 | 6/4/60 |

| RECORD NUMBER 401 | FIRST NAME 402 | SURNAME 403 | ZIP 404 | CITY 405 | STREET 406 | HOUSE NUMBER 407 | BIRTHDATE 408 |
|---|---|---|---|---|---|---|---|
| HJ2 | JOHN | SMITH | 06420 | NEW TOWN | ELM | 111 | 6/4/60 |
| 9400 | J. | SMITH | 06420 | NEW | ELM | 111 | 6/4/60 |
| 01101 | KATHY | JONES | 99013 | OLD TOWN | CENTER | 222 | |
| 01110 | KATHLEEN | JONES | 99013 | OLD TOWN | CENTER | 222 | |
| 3Z-27K | JACK | SMITH | 06420 | NEWTOWN | ELM | 111 | 6/4/60 |
| 3 | JOHN | SMITH | 06420 | NEW TOWN | ELM | 111 | 6/4/60 |
| XYZ | JOHN | SMITH | 06430 | NEW TOWN | ELM | 111 | 6/4/60 |

FIG. 5

| RECORD NUMBER 401 | FIRST NAME 402 | SURNAME 403 | ZIP 404 | CITY 405 | STREET 406 | HOUSE NUMBER 407 | BIRTHDATE 408 |
|---|---|---|---|---|---|---|---|
| HJ2 | JOHN | SMITH | 06420 | NEW TOWN | ELM | 111 | 6/4/60 |
| 9400 | J. | SMITH | 06420 | NEW | ELM | 111 | 6/4/60 |
| 3Z-27K | JACK | SMITH | 06420 | NEWTOWN | ELM | 111 | 6/4/60 |
| 3 | JOHN | SMITH | 06420 | NEW TOWN | ELM | 111 | 6/4/60 |
| 01101 | KATHY | JONES | 99013 | OLD TOWN | CENTER | 222 | |
| 01110 | KATHLEEN | JONES | 99013 | OLD TOWN | CENTER | 222 | |
| XYZ | JOHN | SMITH | 06430 | NEW TOWN | ELM | 111 | 6/4/60 |

FIG. 7

| RECORD NUMBER 401 | FIRST NAME 402 | SURNAME 403 | ZIP 404 | CITY 405 | STREET 406 | HOUSE NUMBER 407 | BIRTHDATE 408 |
|---|---|---|---|---|---|---|---|
| HJ2 | JOHN | SMITH | 06420 | NEW TOWN | ELM | 111 | 6/4/60 |
| 9400 | J. | SMITH | 06420 | NEW | ELM | 111 | 6/4/60 |
| 3Z-27K | JACK | SMITH | 06420 | NEWTOWN | ELM | 111 | 6/4/60 |
| 01101 | KATHY | JONES | 99013 | OLD TOWN | CENTER | 222 | |
| 01110 | KATHLEEN | JONES | 99013 | OLD TOWN | CENTER | 222 | |
| XYZ | JOHN | SMITH | 06430 | NEW TOWN | ELM | 111 | 6/4/60 |

| COMPARED RECORDS | DIFFERENCE VALUES |
|---|---|
| HJ2 & 9400 | 75 |
| HJ2 & 3Z-27K | 10 |
| 9400 & 3Z-27K | 35 |
| 01101 & 01110 | 15 |

FIG. 10

| CUSTOMER ID 501 | RECORD NUMBER 502 | FIRST NAME 503 | SURNAME 504 | ZIP 505 | CITY 506 | STREET 507 | HOUSE NUMBER 508 | BIRTHDATE 509 |
|---|---|---|---|---|---|---|---|---|
| 01-001 | HJ2 | JOHN | SMITH | 06420 | NEW TOWN | ELM | 111 | 6/4/60 |
| 01-001 | 3Z-27K | JACK | SMITH | 06420 | NEWTOWN | ELM | 111 | 6/4/60 |
| 01-001 | 3 | JOHN | SMITH | 06420 | NEW TOWN | ELM | 111 | 6/4/60 |
| 01-002 | 9400 | J. | SMITH | 06420 | NEW | ELM | 111 | 6/4/60 |
| 01-003 | 01101 | KATHY | JONES | 99013 | OLD TOWN | CENTER | 222 | |
| 01-003 | 01110 | KATHLEEN | JONES | 99013 | OLD TOWN | CENTER | 222 | |
| 01-004 | XYZ | JOHN | SMITH | 06430 | NEW TOWN | ELM | 111 | 6/4/60 |

FIG. 12

| RECORD NUMBER 401 | FIRST NAME 402 | SURNAME 403 | ZIP 404 | CITY 405 | STREET 406 | HOUSE NUMBER 407 | BIRTHDATE 408 |
|---|---|---|---|---|---|---|---|
| X439 | JOHN | SMYTH | 06420 | NEW TOWN | ELM | | |
| X440 | J. | SMITH | 06420 | NEW TOWN | ELM | | |
| 2-195 | KATHY | JONES | 99015 | OLD TOWN | CENTRE | 223 | 6/9/65 |

FIG. 14

| COMPARED RECORDS | DIFFERENCE VALUES |
|---|---|
| X439 & HJ2 | 20 |
| X439 & 9400 | 75 |
| X439 & 3Z-27K | 50 |
| X439 & 3 | 20 |
| X439 & 01101 | 190 |
| X439 & 01110 | 195 |
| X439 & XYZ | 50 |
| X440 & HJ2 | 35 |
| X440 & 9400 | 15 |
| X440 & 3Z-27K | 70 |
| X440 & 3 | 35 |
| X440 & 01101 | 175 |
| X440 & 01110 | 180 |
| X440 & XYZ | 65 |
| 2-195 & HJ2 | 125 |
| 2-195 & 9400 | 145 |
| 2-195 & 3Z-27K | 140 |
| 2-195 & 3 | 125 |
| 2-195 & 01101 | 40 |
| 2-195 & 01110 | 50 |
| 2-195 & XYZ | 170 |

FIG. 15

| CUSTOMER ID | RECORD NUMBER | FIRST NAME | SURNAME | ZIP | CITY | STREET | HOUSE NUMBER | BIRTHDATE |
|---|---|---|---|---|---|---|---|---|
| 01-001 | HJ2 | JOHN | SMITH | 06420 | NEW TOWN | ELM | 111 | 6/4/60 |
| 01-001 | 3Z-27K | JACK | SMITH | 06420 | NEWTOWN | ELM | 111 | 6/4/60 |
| 01-001 | 3 | JOHN | SMITH | 06420 | NEW TOWN | ELM | 111 | 6/4/60 |
| 01-001 | X439 | JOHN | SMYTH | 06420 | NEW TOWN | ELM | | |
| 01-001 | X440 | J. | SMITH | 06420 | NEW TOWN | ELM | | |
| 01-002 | 9400 | J. | SMITH | 06420 | NEW | ELM | 111 | 6/4/60 |
| 01-003 | 01101 | KATHY | JONES | 99013 | OLD TOWN | CENTER | 222 | |
| 01-003 | 01110 | KATHLEEN | JONES | 99013 | OLD TOWN | CENTER | 222 | |
| 01-003 | 2-195 | KATHY | JONES | 99015 | OLD TOWN | CENTRE | 223 | 6/9/65 |
| 01-004 | XYZ | JOHN | SMITH | 06430 | NEW TOWN | ELM | 111 | 6/4/60 |

| RECORD NUMBER | OLD CUSTOMER ID | NEW CUSTOMER ID | MODIFICATION DATE | OPERATOR ID |
|---|---|---|---|---|
| X440 | 01-001 | 01-002 | 10/12/01 | RUEDING1 |
| N/A | 01-004 | 01-001 | 10/12/01 | RUEDING1 |
| 2-195 | 01-003 | 01-005 | 11/01/01 | ADMIN0 |

FIG. 18

DEDUPLICATION SYSTEM

BACKGROUND OF THE INVENTION

1. Field of the Invention

The present invention relates to systems for processing data. More specifically, the present invention concerns systems for identifying duplicate data records and may be used to store such duplicate records in a data warehouse.

2. Discussion of the Prior Art

Modern businesses rely on computer systems to execute their various business processes. A typical business may operate several different computer systems, with each system addressing a particular need. Each of these systems generates disparate data that is valuable to the business. A data warehouse is commonly used to store, organize, manipulate and retrieve this data.

Generally, a data warehouse is a repository of current and historical data pertaining to any subject, entity, or other focus. Advantageously, a data warehouse may store different types of data from different types of systems in a manner that can be efficiently searched, retrieved and analyzed. A data warehouse operated by a business may, in this regard, receive and store data from several different legacy systems operated by outside vendors, from an external server of an operational system operated by the business, and from an internal server operated by the business. A data warehouse may be used in many different environments, with or without conventional elements such as data marts, archives, and other data warehouses.

Because data warehouses receive large amounts of data from different sources, the received data is often duplicative of other stored or received data. Problems may occur if the duplicative data is not recognized as such. For example, contact information may be stored in a data warehouse in association with a customer ID representing a particular customer. Next, data may be received that includes contact information of the particular customer. The received data may differ from the stored data due to entry errors, changes in contact information (e.g., an address), or the like. However, for the purposes of the present description, the stored data and the received data are consider duplicative because they both represent contact information of the particular customer. Unless the received data is recognized as duplicative, the received data may be associated with a new customer ID and stored in the data warehouse in association therewith. Therefore, in a case that the stored data is used to generate advertising mailings, two sets of mailings and other communications would be sent to the particular customer. Moreover, customer behavior cannot be properly analyzed if actions of one customer are attributed to two or more customers represented by customer IDs maintained by the data warehouse. Of course, problems caused by duplicative data are not reserved to contact information.

Proportions of stored duplicative data, as well resulting problems, increase along with the volume of data stored in a data warehouse. In fact, currently-operating data warehouses include up to 12% duplicate records. Of course, an average percentage of duplicate records may vary across businesses. Systems have therefore been developed that attempt to address the problem of duplicate records. These systems, such as Match IT™, DeDupe™ and TrueMatch™, purport to identify duplicate records, however the present inventor has not found these systems to be satisfactorily efficient, effective, or compatible with existing data warehousing systems.

BRIEF SUMMARY OF THE INVENTION

In order to address the foregoing, the present invention concerns a system, a method, an apparatus, a computer-readable medium storing processor-executable process steps, and means to determine a value representing a difference between a first record comprising a first plurality of data fields and a second record comprising a second plurality of data fields, each of the first plurality of data fields corresponding to a respective one of the second plurality of data fields, including determination, for each of the first plurality of data fields, of a first value representing a difference between data specified in the data field and data specified in a respective one of the second plurality of data fields, determination, for each of the second plurality of data fields, of a second value representing a difference between data specified in the data field and data specified in a respective one of the first plurality of data fields, and determination of a third value representing a difference between the first record and the second record based on the determined first and second values.

In another aspect, a plurality of records are received, each of the plurality of records including a plurality of data fields, a plurality of groups of records are identified, wherein data specified in one or more of the plurality of data fields included in a record of a group is identical to data specified in one or more corresponding data fields included in each other record of the group, values representing differences between each record of a group and each other record of the group are determined for each group, and at least two of the plurality records are identified as duplicates based on a determined value representing a difference between the two records.

In yet another aspect, a plurality of new records are received, values representing differences between a new record and one or more of the existing records are determined for each of the plurality of new records, at least one of the plurality of new records and one of the existing records are identified as duplicates based on a determined value representing a difference between the two records, and the at least one of the plurality of new records is stored in the data warehouse in association with an identifier identical to an identifier associated with the one of the existing records.

According to another aspect, a plurality of records are received, values representing differences between a record and each other of the plurality of records are determined for each of the plurality of records, at least two of the plurality records are identified as duplicates based on a determined value representing a difference between the two records, and the two records are stored in the data warehouse in association with a same identifier.

By virtue of some embodiments of each of the various aspects, the present invention may provide effective identification of duplicate records among newly-received records, existing warehoused records, and/or between newly-received records and existing warehoused records. Also provided may be an efficient deduplication system in which a number of data comparisons is reduced with respect to conventional systems and/or in which duplicate records may be advantageously associated and tracked in a data warehouse.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 4 is a tabular representation of a portion of data for an initial database load according to some embodiments of the present invention.

FIG. 5 is a tabular representation of a portion of data for an initial database load as processed according to some embodiments of the present invention.

FIG. 7 is a tabular representation of a portion of data for an initial database load as processed according to some embodiments of the present invention.

FIG. 8 is a tabular representation of data for an initial database load as processed according to some embodiments of the present invention.

FIG. 10 is a table including difference values corresponding to pairs of records generated according to embodiments of the invention.

FIG. 12 is a tabular representation of a portion of data warehoused according to some embodiments of the present invention.

FIG. 14 is a tabular representation of a portion of data for loading into an existing data warehouse according to some embodiments of the present invention.

FIG. 15 is a table including difference values corresponding to pairs of records determined during loading of data into existing warehoused data according to embodiments of the invention.

FIG. 17 is a tabular representation of a portion of warehoused data after a load of new data into existing warehoused data according to some embodiments of the present invention.

FIG. 18 is a tabular representation of a portion of a customer ID journal table according to some embodiments of the present invention.

DETAILED DESCRIPTION OF THE INVENTION

System Architecture

Figure 1:
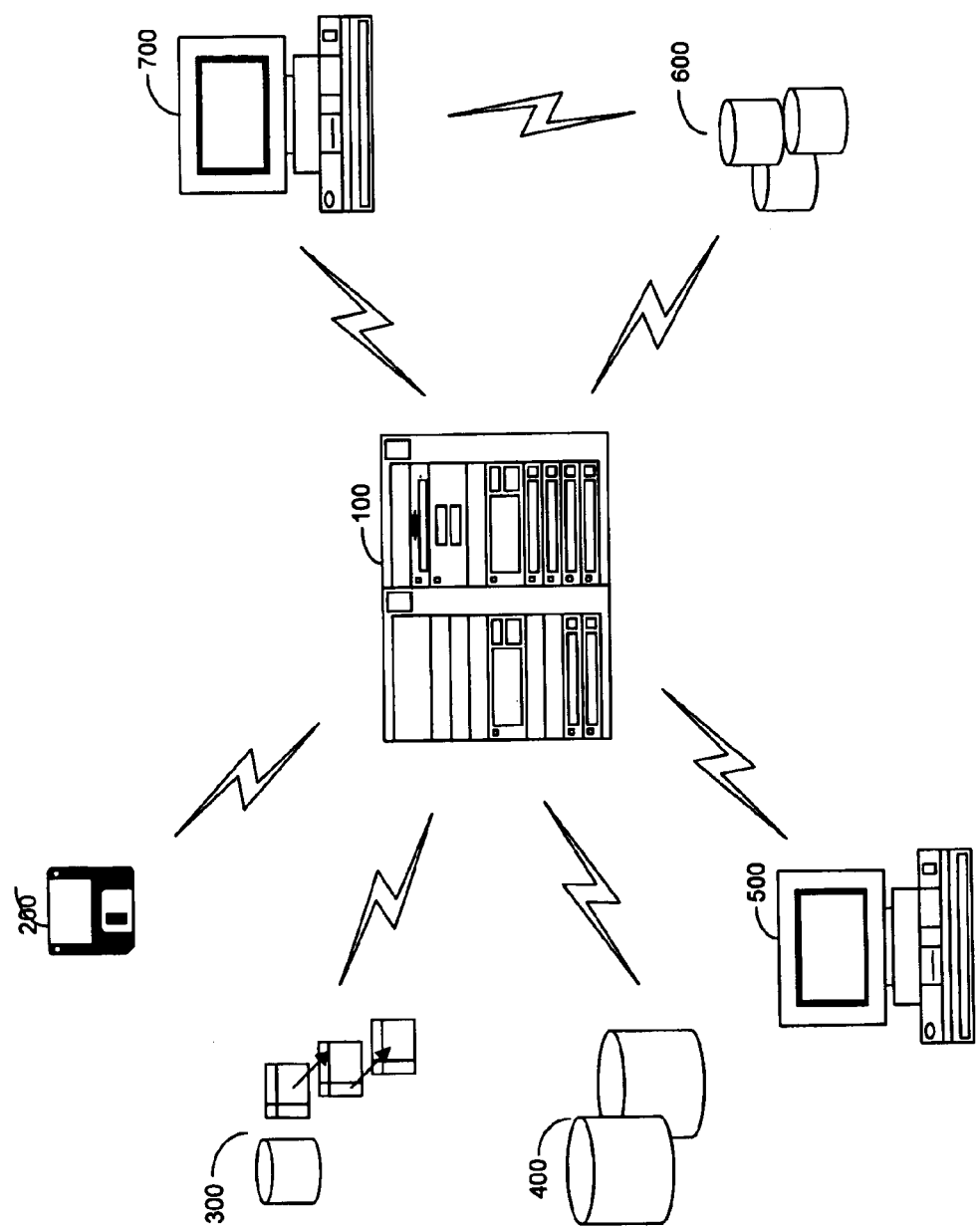
FIG. 1 is a diagram of a system architecture according to some embodiments of the invention.

FIG. 1 illustrates an architecture of a generic system utilizing data warehouse 100. Data warehouse 100 may be utilized as described above to store current and historical data related to a particular business. The data may be stored in a manner that promotes data uniformity and accessibility. Data warehouse 100 is depicted by a mainframe server in FIG. 1, but may comprise any device or devices capable of performing process steps attributed to data warehouse 100 herein. According to one of many possible examples, data warehouse 100 is an IBM RS/6000™ server including a plurality of processors and executing the IBM AIX™ operating system and the Universal™ database management system. Data warehouse 100 may provide data warehousing services for one or more entities. For simplicity, the present discussion will be limited to a single entity.

According to the data warehousing system depicted in FIG. 1, operational data is initially received from external system media 200, Enterprise Resource Planning systems 300, legacy system 400, and/or front office automation system 500. Operational data is generally defined as any data used to maintain day-to-day operations of the particular business. External system media 200 may include any computer-readable medium, such as a diskette, a CD-ROM or a transmission from a provider's extranet, that provides data such mailing lists, demographic data, or the like. Enterprise Resource Planning systems 300 may comprise devices, data repositories, and/or networks that provide data collected and managed during execution of internal business-related processes. Data may be provided from relational or non-relational databases of legacy system 400 in a specific legacy format, and front office automation system 500 may provide data generated by front office processes. Of course, some embodiments of the present invention may operate in conjunction with other types of data received from other data sources.

Upon receiving data from sources 200 through 500, data warehouse 100 operates to transform the data into a format suitable for storing and to load the transformed data into a storage device of data warehouse 100. In order to store received data in the manner described above, the data is transformed according to business rules that apply to data usage of the particular business operating data warehouse 100. For example, received customer address data or contact information may be transformed to comply with a format specified for data warehouse 100. Of course, it may be necessary to apply different transformation algorithms to data received from different ones of systems 200 through 500 in order to create consistently-formatted data. Specific processes for extracting and loading data are described below with respect to FIGS. 3 and 13.

Data marts 600 are commonly used in data warehouse architectures to provide specialized data to particular users. Such usage increases the efficiency of warehousing systems because the data may be transformed and stored in view of the purposes of the specific users. Moreover, traffic directed to each data mart will result in more distributed processing loads.

User device 700 may be operated to access data stored in data warehouse 100 or data marts 600 as well as reports generated thereby. User device 700 may be a dedicated terminal networked with data warehouse 100, a general-purpose computer, or any other device, including a personal digital assistant, a cellular telephone and a kiosk. In some embodiments, user device 700 executes a Web browser to access Web pages including data and/or reports that are provided by a Web server executed by data warehouse 100.

Although the communication links between each of elements 200 through 700 and data warehouse 100 are depicted by identical symbols, the links may comprise any number of different systems for transferring data, including a local area network, a wide area network, a telephone network, a cellular network, a fiber-optic network, a satellite network, an infra-red network, a radio frequency network, and any other type of network which may be used to transmit information between devices. Moreover, the communication may proceed over any known transmission protocol, such as Asynchronous Transfer Mode (ATM), Internet Protocol (IP), Hypertext Transfer Protocol (HTTP) and Wireless Application Protocol (WAP). In some embodiments, all data is transmitted over the World Wide Web.

In other embodiments, the devices of FIG. 1 are connected differently than as shown. For example, some or all of the devices may be connected directly to one another. Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Data Warehouse

Figure 2:
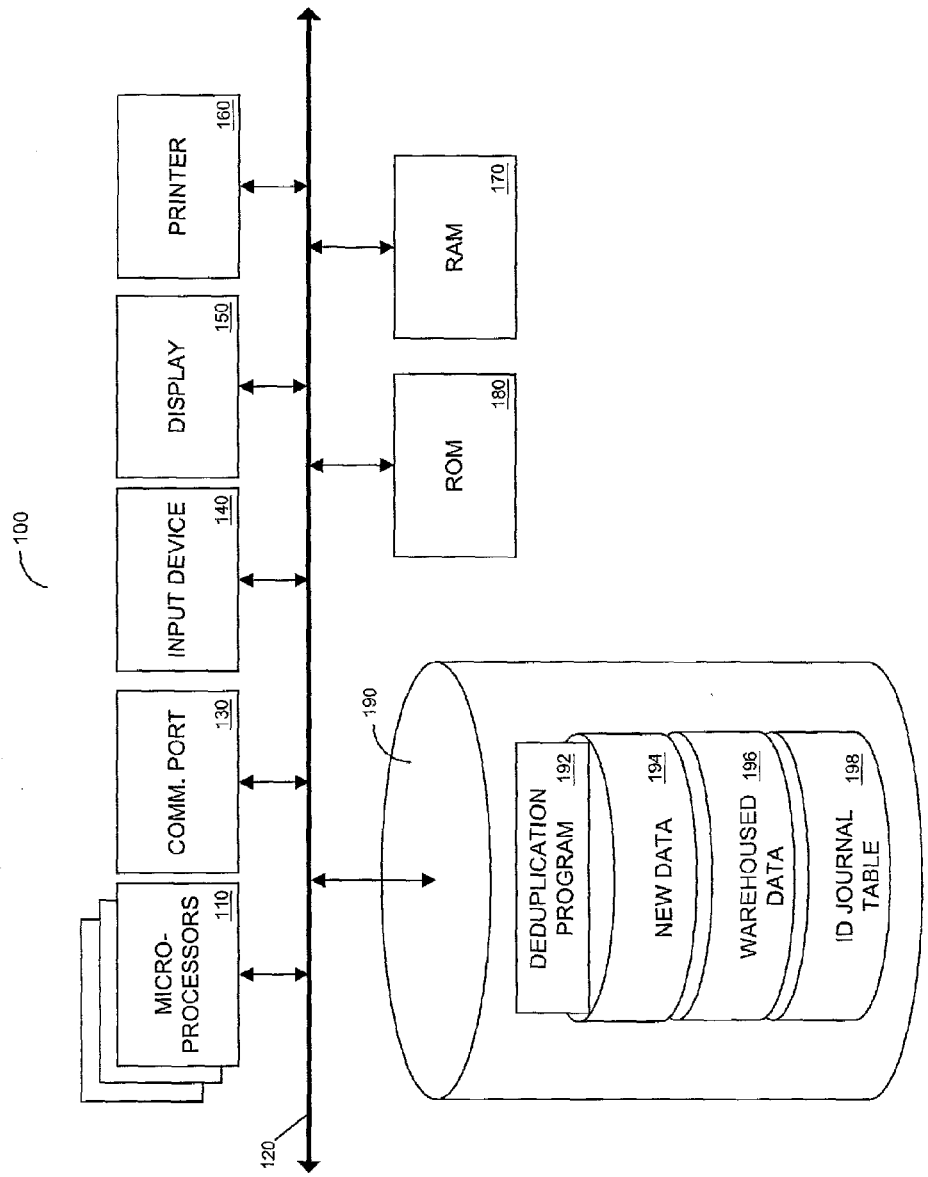
FIG. 2 is a block diagram illustrating an internal architecture of a data warehouse according to some embodiments of the present invention.

FIG. 2 is a block diagram of an internal architecture of data warehouse 100 according to some embodiments of the invention. As illustrated, data warehouse 100 includes microprocessors 110 in communication with communication bus 120. Microprocessors 110 may comprise RISC-based and other types of processors and are used to execute processor-executable process steps so as to control the elements of data warehouse 100 to provide desired functionality.

Also in communication with communication bus 120 is communication port 130. Communication port 130 is used to transmit data to and to receive data from devices external to data warehouse 100 such as devices 200 through 700. Communication port 130 is therefore preferably configured with hardware suitable to physically interface with desired external devices and/or network connections. For example, communication port 130 may comprise an Ethernet connection to a local area network through which data warehouse 100 may receive and transmit information over the Web. Such data may include customer identifying information and queries from user device 700.

Input device 140, display 150 and printer 160 are also in communication with communication bus 120. Any known input device may comprise input device 140, including a keyboard, mouse, touch pad, voice-recognition system, or any combination of these devices. Of course, information may also be input to data warehouse 100 via communication port 130. Display 150 may be an integral or separate CRT display, flat-panel display or the like used to display graphics and text in response to commands issued by microprocessors 110. Printer 160 may also present text and graphics to an operator, but in hardcopy form using ink-jet, thermal, dot-matrix, laser, or other printing technologies. Elements 140 through 160 are most likely used sparingly during operation of data warehouse 100, but may be used by an operator for setup and administration.

RAM 170 is connected to communication bus 120 to provide microprocessors 110 with fast data storage and retrieval. In this regard, processor-executable process steps being executed by microprocessors 110 are typically stored temporarily in RAM 170 and executed therefrom by microprocessors 110. ROM 180, in contrast, provides storage from which data can be retrieved but to which data cannot be stored. Accordingly, ROM 180 is used to store invariant process steps and other data, such as basic input/output instructions and data used during boot-up of data warehouse 100 or to control communication port 130. It should be noted that one or both of RAM 170 and ROM 180 may communicate directly with microprocessors 110 instead of over communication bus 120.

Data storage device 190 stores, among other data, processor-executable process steps of deduplication program 192. Deduplication program 192 may comprise a subset of loading scripts stored in storage device 190 and used to extract, format and load data into data warehouse 100. More specifically, microprocessors 110 execute the process steps of deduplication program 192 in order to control data warehouse 100 to identify duplicate records and/or to load records into data warehouse 100 according to embodiments of the present invention.

The process steps of deduplication program 192 may be read from a computer-readable medium, such as a floppy disk, a CD-ROM, a DVD-ROM, a Zip™ disk, a magnetic tape, or a signal encoding the process steps, and then stored in data storage device 190 in a compressed, uncompiled and/or encrypted format. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

New data 194 is also stored in data storage device 190. For the present description, new data 194 includes data that has been received by data warehouse 100 but that has not been fully processed by data warehouse 100 to create warehoused data that is ready for access by data marts 600 or user device 700. New data 194 may include any type of data, but will be described herein as including discrete records of customer identifying information. Such information may be received via communication port 130 from any of devices 200 through 500, and may include information that is associated with prospective applicants assessed by a risk department, information from lottery and/or raffle entries, and information from listbroker customer lists.

It should be noted that data warehouse 100 is not required to store newly-received data in data storage device 190. Rather, new data may be processed on the fly, perhaps by being temporarily stored in RAM 170 prior to warehousing the processed data. Examples of new data 194 as processed according to some embodiments of the invention are presented below.

Warehoused data 196 includes data that has been received, transformed and loaded into data warehouse 100 according to warehousing protocols established by an operating entity. That is, the data of warehoused data 196 is ready for access by data marts 600 and user device 700. According to some embodiments of the present invention, a deduplication process has been applied to the data of warehoused data 196 prior to storage therein. In the examples set forth below, warehoused data 196 includes records representing customer identifying information.

ID journal table 198 may be used in accordance with embodiments of the present invention to specify how records of warehoused data 196 have changed as a result of deduplication according to the invention. In this regard, a record of warehoused data 196 may be associated with one customer ID prior to a deduplication process and with another customer ID after the process. Accordingly, journal table 198 is updated to reflect the change. Changes to warehoused data 196 due to deduplication may be thereby efficiently tracked.

Also stored in data storage device 190 may also be other unshown elements that may be necessary for operation of data warehouse 100, such as an operating system, a database management system, other applications, other data files, and "device drivers" for allowing microprocessors 110 to interface with devices in communication with communication port 130. These elements are known to those skilled in the art, and are therefore not described in detail herein.

One possible stored application may include processor-executable process steps of a Web server. These process steps may be executed by microprocessors 110 to transmit data to and to receive data from Web clients, such as Web browsers, over the Web. As described above, the data may include Web pages presenting warehoused data and/or reports generated therefrom.

Deduplication Process

Figure 3:
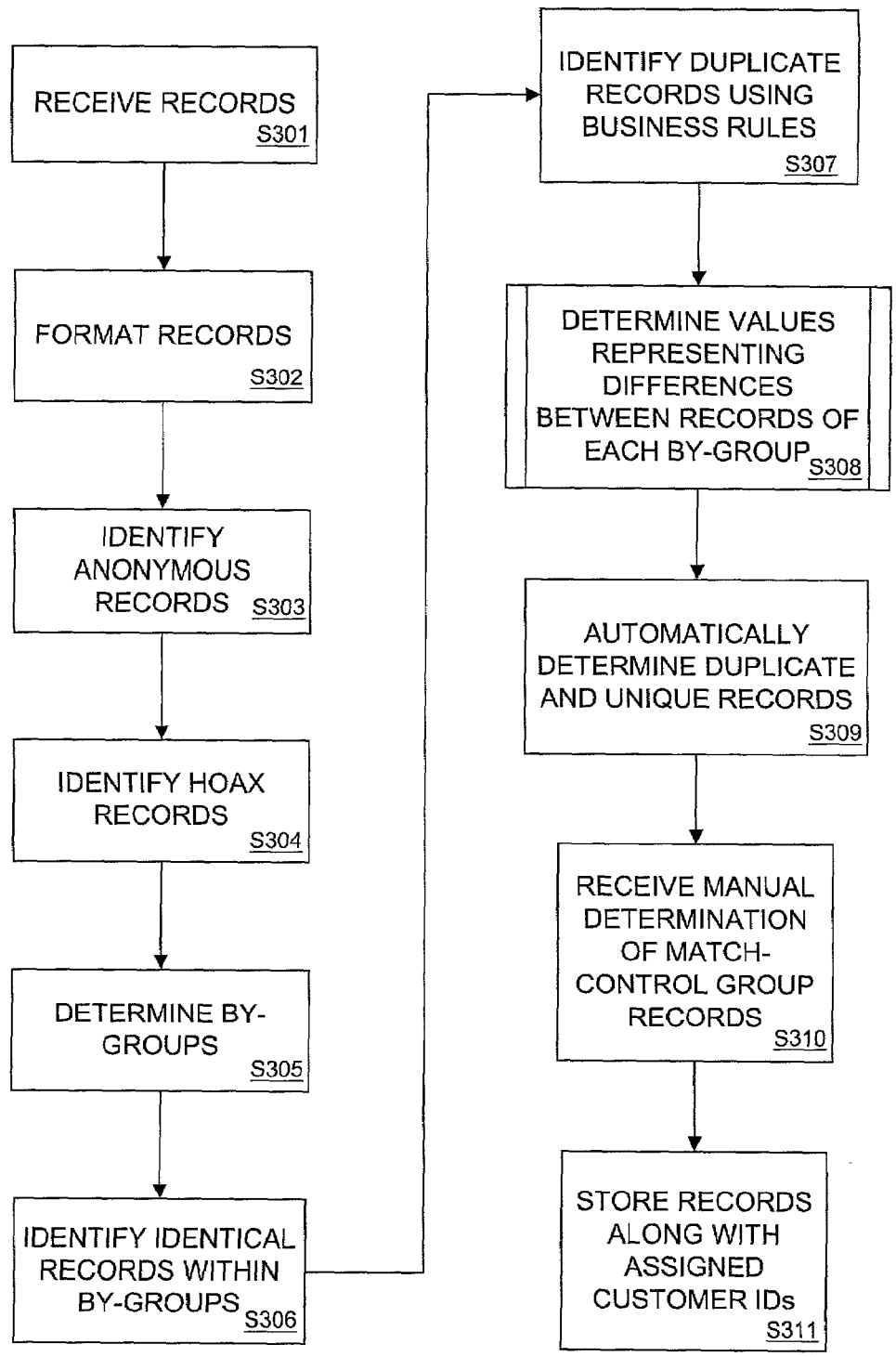
FIG. 3 illustrates a flow diagram of process steps to provide deduplication according to some embodiments of the invention.

FIG. 3 comprises a flow diagram of process steps according to some embodiments of the present invention. The process steps may be embodied, in whole or in part, in deduplication program 192 and executed, in whole or in part, by data warehouse 100 or by another device.

Briefly, the FIG. 3 process steps provide for loading data in a data warehouse by reception of a plurality of records, each of the plurality of records including a plurality of data fields, identification of a plurality of groups of records, wherein data specified in one or more of the plurality of data fields included in a record of a group is identical to data specified in one or more corresponding data fields included in each other record of the group, determination of values for each group representing differences between each record of a group and each other record of the group, and identification of at least two of the plurality records as duplicates based on a determined value representing a difference between the two records.

In addition, the process steps provide for loading data in a data warehouse through reception of a plurality of records, determination of values representing differences between a record and each other of the plurality of records for each of the plurality of records, identification of at least two of the plurality records as duplicates based on a determined value representing a difference between the two records, and storage of the two records in the data warehouse in association with a same identifier. As a result, the process steps may provide efficient identification and loading of duplicate records into a data warehouse.

The process steps of FIG. 3 will be described in the context of an initial data load. That is, it will be assumed that no data exists in warehoused data 196 of data storage device 190 prior to step S301. Moreover, it will be assumed that the data to be loaded represents customer identifying information that will be assigned a customer ID upon loading. It should be noted, however, that some embodiments of the present invention may operate in conjunction with records representing other types of information.

Initially, in step S301, a plurality of records are received from a data source. The records may be received from one or more of data sources 200 through 500 and other data sources. FIG. 4 is a tabular representation of a portion of new data 194 as received in step S301 and stored in data storage device 190. In some embodiments, records received in step S301 are not stored in data storage device 190 but are cached in RAM 170 or another storage element. Such caching may provide for faster processing of the records.

The records shown in FIG. 4 include a plurality of fields, with each field specifying a particular type of data. Specifically, the fields include record number field 401, first name field 402, surname field 403, zip field 404, city field 405, street field 406, house number field 407 and birthdate field 408. The data specified in each field may be gathered in any way by the data source from which it was obtained, and the records may be received from several different data sources. In this regard, data specified in record number field 401 of a record represents a record number assigned by a data source from which the record was received. Records will be referred to herein using respective data from record number field 401. Other information that may be included among customer identifying information includes telephone number, facsimile number, gender, marital status, height, weight, and ethnicity.

The received records are formatted in step S302. The type of formatting performed in step S302 is often referred to as data cleansing. Data cleansing is performed to increase the quality of the cleansed data. The quality may be increased by assuring that various fields of each received records are formatted according to standard data formats corresponding to the various fields. The standard formats may differ depending on the environment from which the records are obtained. For example, a German zip code uses a five digit format while an Austrian zip code uses a four digit format.

Examples of the formatting processes that may occur in step S302 include: changing ALL CAPS text to standard case, moving data from an inappropriate field to an appropriate field (e.g., zip specified in city field 405), correcting spelling, correcting incorrect correlations between data (e.g., zip and city mismatched), and removing spurious data from fields. Frequency analysis may be employed to determine the reliability of text entries (i.e., an entry occurring more than X times is deemed to be reliable). Of course, any appropriate current or hereafter known data cleansing process may be used in step S302.

Anonymous records are identified in step S303. In order to protect customers, certain records such as those relating to personal loans do not include personal information. Since customer identification is not appropriate for these records, the records are ignored during subsequent steps. Also ignored are hoax records identified in step S304. Hoax records include non-missing but useless data. One method for identifying hoax data includes determination of an address quality index that assigns values to data specified in particular fields based on whether the data is similar to the type of data expected in the particular fields. As described above, the values and the expected data may vary from country to country in a case that the records represent customer identifying information.

FIG. 5 represents new data 194 after steps S302 and S303. As shown, records "849-3SBD" and "035" have been deleted after being identified as anonymous and hoax records, respectively. Of course, these records do not necessarily need to be deleted from new data 194 or from whatever storage device in which they reside, but may be flagged or otherwise ignored.

By-groups are determined in step S305. A by-group consists of one or more records, with each record including data specified in one or more data fields that is identical to the data specified in corresponding data fields of each other record of the by-group. As will be evident from the following description, the use of by-groups may reduce a number of comparisons required during a deduplication process and also increase the accuracy thereof.

Figure 6:
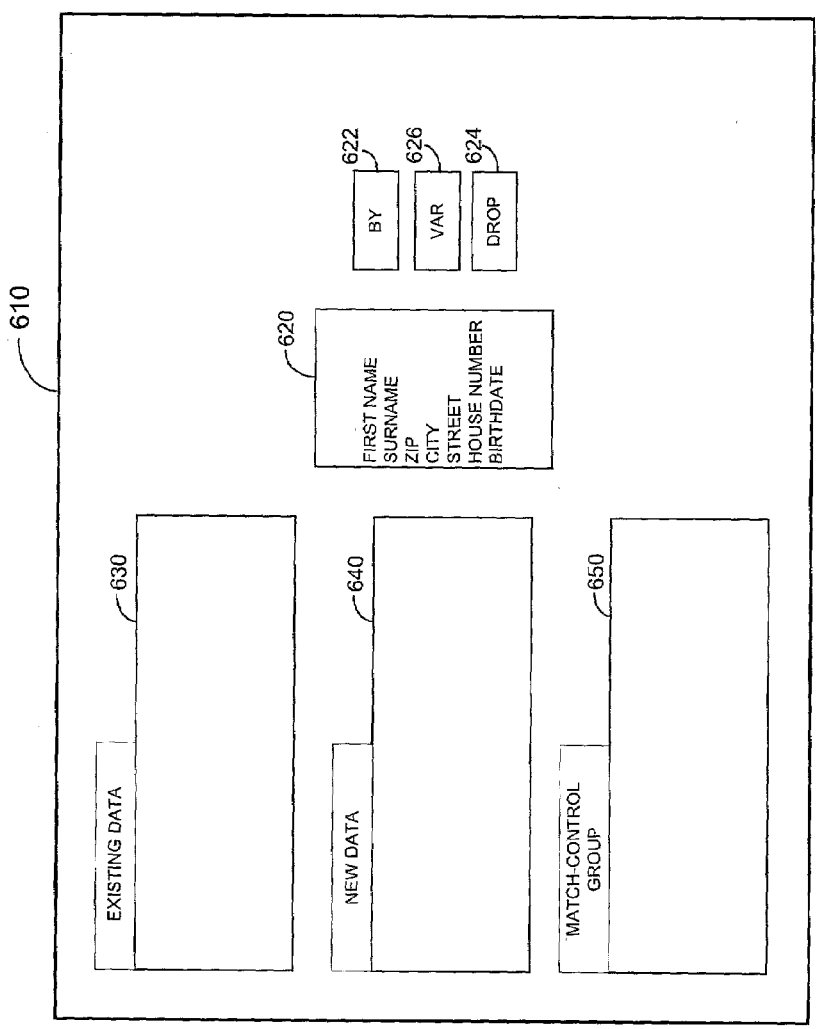
FIG. 6 is an outward view of an interface for use in deduplication according to some embodiments of the present invention.

In order to determine by-groups, one or more data fields are determined which will specify identical data in each record of a by-group. These by-group fields may be determined by receiving input from an operator of data warehouse 100, by calculating preferred fields based on past performance data, and/or by any other method. FIG. 6 illustrates an interface for receiving input from an operator that may be used to determine the one or more data fields.

Interface 610 may be displayed to an operator in step S305 by display 140 of data warehouse 100 or by another device in communication with data warehouse 100. Interface 610 includes fields area 620 in which the one or more by-group fields for determining by-groups may be identified. As shown, each field of the received records is initially displayed in fields area 620. In order to specify the one or more fields, an operator may initially select the "By" icon 622 and then use the "Drop" icon 624 to remove selected fields from fields area 620. Remaining fields are defined as the by-group fields. "Var" icon 626 may be used similarly to define variable fields, which are those fields in which records of a by-group include non-identical data. As should be understood, each data field of the received records will be either a by-group field or a variable field.

Also shown in FIG. 6 are warehoused data area 630 for displaying data currently stored in warehoused data 196 and new data area 640 for displaying received data records that have not yet been loaded into data warehouse 100. Match-control group area 650 is used to display pairs of records to an operator in order to allow the operator to specify whether the pairs comprise duplicate records. This process will be described in detail below.

Once the one or more by-group fields are determined, by-groups are determined by identifying those records in which the by-group fields specify identical information. FIG. 7 illustrates new data 194 arranged according to by-group in a case that the one or more by-group fields comprise surname field 403, zip field 404 and birthdate field 408. Each by-group in FIG. 7 is identified by brackets. Again, the received records need not be stored and manipulated in new data 194 as described herein. Alternatively, the data may be stored in RAM 170 and flagged in a manner associating records with various by-groups.

In step S306, identical records within each by-group are identified. According to the present example, records "HJ2" and "3" are identical. As a result, the first record, "HJ2", is maintained and the second record, "3", is ignored. FIG. 8 illustrates a portion of new data 194 in which record "3" has been removed for clarity. As described above with respect to anonymous and hoax records, a record described herein as ignored is maintained along with a notation that the record is anonymous, hoax or identical to another record. Such a notation facilitates proper loading of the record in warehoused data 196. In the case of an ignored identical record, the notation specifies a corresponding identical record, such as "HJ2". This particular notation signals that the ignored record should be associated in warehoused data 196 with a customer ID that is identical to the customer ID associated with the corresponding identical record.

Duplicate records are identified in step S307 using business rules. In other words, special business considerations or protocols are taken into account in step S307 to attempt to identify two or more received records that correspond to a same customer. For example, account numbers specified in two records may be compared with an account number database to determine that the numbers correspond to a same consumer. Accordingly, the records are identified as duplicate records in step S307 and are therefore treated similarly to the records identified in step S306.

Figure 9:
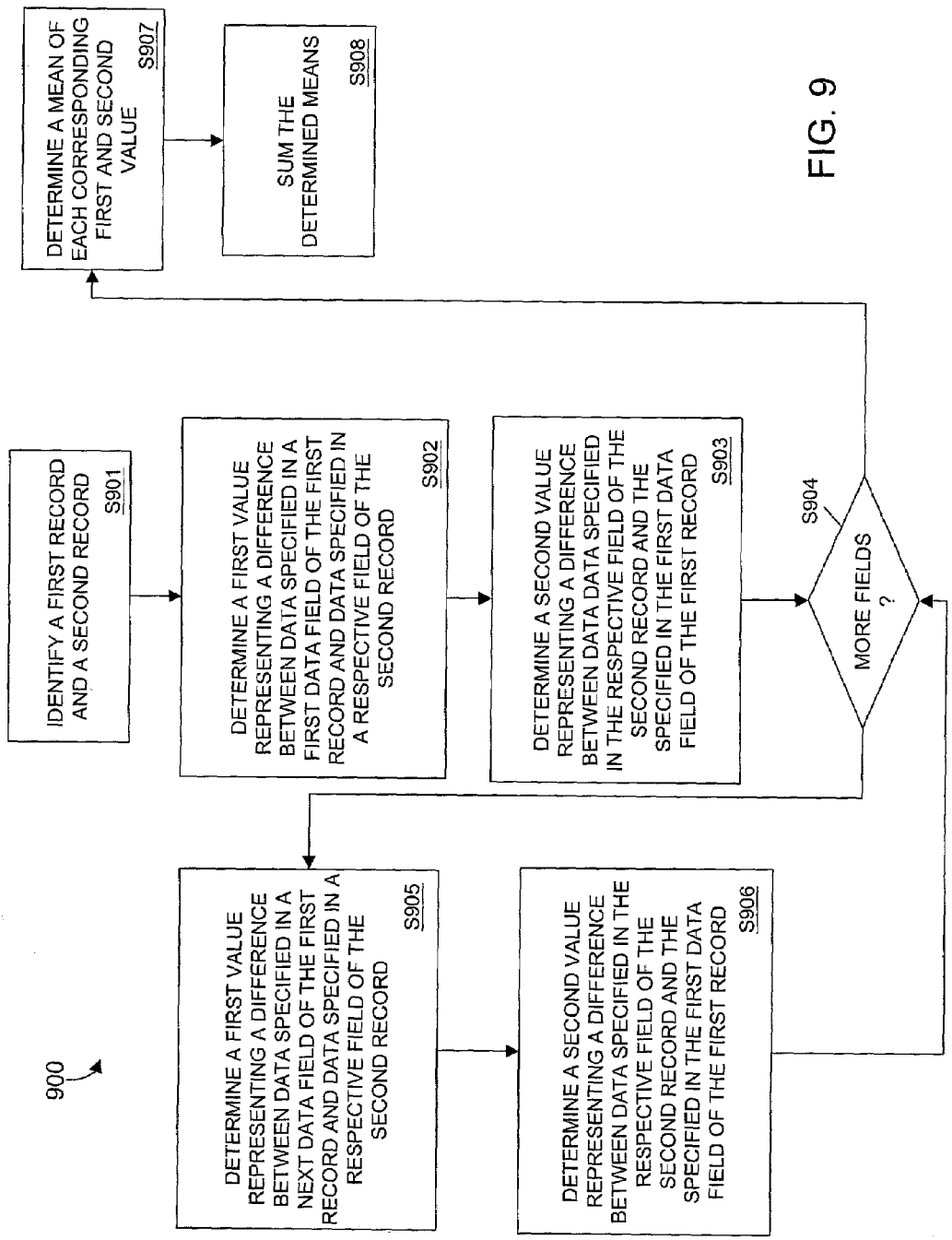
FIG. 9 illustrates a flow diagram of process steps to determine a value representing a difference between two records according to some embodiments of the invention.

In step S308, values representing differences between each record of a by-group are determined. More specifically, values are determined for each by-group representing differences between each record of a by-group and each other record of the by-group. The values may be determined in many different manners. FIG. 9 illustrates process steps 900 for determining difference values according to some embodiments of the invention.

Briefly, the FIG. 9 process steps provide a value representing a difference between a first record comprising a first plurality of data fields and a second record comprising a second plurality of data fields, each of the first plurality of data fields corresponding to a respective one of the second plurality of data fields. The steps include determination, for each of the first plurality of data fields, of a first value representing a difference between data specified in the data field and data specified in a respective one of the second plurality of data fields, determination, for each of the second plurality of data fields, of a second value representing a difference between data specified in the data field and data specified in a respective one of the first plurality of data fields, and determination of a third value representing a difference between the first record and the second record based on the determined first and second values.

A first record and a second record of a by-group are identified in step S901. Identification of the records may include reception of the records from a storage area of data warehouse 100 by another storage area of data warehouse 100 or another device, or flagging or otherwise preparing the records for processing. The first record includes a first plurality of data fields and the second record includes a second plurality of data fields, with each of the first plurality of data fields corresponding to one of the second plurality of data fields. According to the present example, records "HJ2" and "9400" may be identified in step S901.

In step S902, a first value is determined representing a difference between data specified in a first data field of the first record and data specified in a respective field of the second record. In some embodiments, the first data field and the respective field do not include any of the by-group fields used to determine by-groups in step S305 of FIG. 3, because data included in these fields is identical in both records, since both records belong to a same by-group.

The value may be determined in step S902 in many ways, including by using the SPEDIS function provided by SAS software™, releases 6.12 and higher. The SPEDIS function provides a value reflecting an asymmetric spelling distance between two words. More specifically, the SPEDIS function computes the distance as a normalized cost for converting a key word to a query word via a sequence of operations. Each operation corresponds to a cost, and the total cost of each operation is divided by the length of the query word to produce the value. Usually, SPEDIS (key, query) does not equal SPEDIS(query, key). Of course, other functions for computing the value in step S902 may be used, including other systems for computing an asymmetric distance between two pieces of data, and/or for computing the distance as a normalized cost for converting a key word to a query word via a sequence of operations.

With more particularity, use of the SPEDIS function in step S902 requires conversion, if necessary, of the data specified in the first data field and the data specified in the respective filed of the second record to text data. Such conversion may occur in step S902, in the formatting of step S302, or in any other step prior to step S902. In a specific example of step S902 using the SPEDIS function, the data specified in the first data field of the first record is "John" and the data specified in the respective data field of the second record is "J." Accordingly, the first data field and the respective data field correspond to first name field 402 which, as mentioned above, is not a field based on which the by-groups were determined in step S305. In this example, it is assumed that the value determined by the function SPEDIS(J., John) equals 75. This value may differ depending on the normalized costs assigned to each operation required to convert "John" to "J."

Next, in step S903, a second value is determined representing a difference between data specified in the field of the second record and the data specified in the first data field of the first record. Continuing with the above example, the value is determined by the function SPEDIS(John, J.). It will be assumed that the determined value is 100. Note that the value is different from the value calculated in step S902 because the SPEDIS function computes an asymmetric spelling distance. By determining the difference values as described with respect to steps S902 and S903, an accurate and reliable determination of duplicate records may be obtained.

It is then determined in step S904 whether more fields of the records exist for which difference values should be determined. In some embodiments, the difference values are calculated for all fields, therefore the determination in step S904 determines if values have been determined for all fields in each record. As described above, some embodiments determine difference values only for variable fields, which are those fields that were not used to determine by-groups.

If it is determined that more fields exist, flow continues to steps S905 and S906. Steps S905 and S906 proceed as described above with respect to steps S902 and S903, respectively, but in conjunction with data specified in a field other than first name field 402. In some embodiments, the field is a field such as city field 405, which was not used to determine by-groups in step S305. If city field 405 is used in steps S905 and S906, the data specified in the field in the first record and the second record is "New Town" and "New", respectively. It will be assumed that corresponding values determined in steps S902 and S903 are 120 and 150, respectively. Flow returns from step S906 to step S904, wherein it is again determined whether values have been determined for all corresponding fields of the first and second records. If all values have been determined, flow proceeds to step S907.

In step S907, the mean of corresponding first values and second values are determined. Using the above-mentioned values, means determined in step S907 include (75+100)/2=57.5 and (120+150)/2=135. Of course, other means are be determined in step S907 in a case that the received records include more than two data fields. The determined means are summed in step S908 to produce a difference value representing a difference between the first record and the second record. As an alternative to steps S907 and S908, all determined first and second values may be summed and the sum may be divided by two to produce the difference value. Other methods to determine the difference value may also be employed in other embodiments of the invention.

Process steps 900 are repeated for each combination of two records of a by-group, and are thereafter repeated for each by-group. Accordingly, upon entering step S309, values representing a difference between each record of a by-group and each other record of the by-group have been determined for each by-group. To illustrate, FIG. 10 shows a table that associates difference values with each combination of records shown in FIG. 8. Such a table may be stored in data storage device 190, in RAM 170, or elsewhere and may be used in step S309 to determine whether each combination reflects duplicate or unique records.

In some embodiments of step S309, two records corresponding to a difference value that is less than a first threshold amount are determined to be duplicates. If the difference value is greater than a second threshold amount, the records are considered unique. As an example, some embodiments of the invention operated by the inventor use 17 as the first threshold value and 40 as the second threshold value. Of course, appropriateness of these threshold values is subject to a number of variable data fields, costs assigned to spelling operations used to determine values according to process steps 900, and a manner in which the difference values are determined. Due to these complexities, appropriate threshold values may be determined through trial and error.

Figure 11:
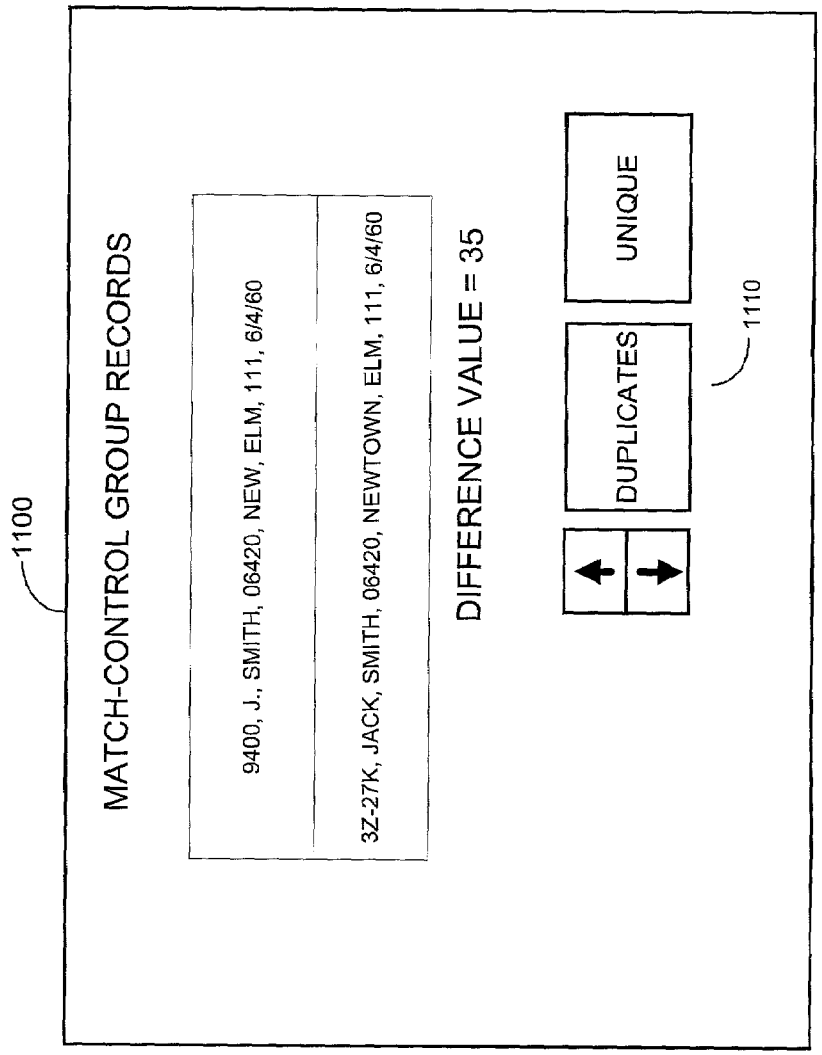
FIG. 11 is an outward view of an interface for manually identifying duplicate records of a match-control group according to some embodiments of the present invention.

Using the above threshold values, no duplicity determination is made for pairs of records corresponding to a value between 17 and 40. These records comprise a match-control group, and manual intervention is used to determine whether the pairs represent duplicate or unique records. In some embodiments, user interface 1100 of FIG. 11 is displayed to an operator in step S310 to receive a determination of whether records of the match-control group are duplicative or unique. As described above, interface 610 may also be used for this purpose.

As shown, user interface 1100 displays each pair of records of the FIG. 10 table that is associated with a difference value between 17 and 40. Interface buttons 1110 allow an operator to select a pair of records and to designate the selected pair as unique or as duplicates. The designation is received in step S310 and all received records are stored in step S311.

The received records are stored in warehoused data 196 of data storage device 190 in association with customer IDs. The customer IDs reflect the determination of duplicate records resulting from process steps S301 through S310. Specifically, duplicate records are assigned identical customer IDs and unique records are assigned unique customer IDs. FIG. 12 illustrates a tabular representation of a portion of warehoused data 196 according to the present example. The records of warehoused data 196 are illustrated as sorted according to customer ID field 501 and otherwise including the same data fields as shown in new data 194, but of course may be stored in different arrangements and including different data fields. As shown, warehoused data 196 includes record number "3", which was identified as a duplicate in step S306 and which was accordingly not subjected to the processing of process steps 900. Record number "3" is therefore stored in warehoused data 196 in association with the record of which it is a duplicate, record number "HJ2". Since the present example is described in the context of an initial load, it is assumed that the records stored in step S311 are the only records stored in warehoused data 196. In some embodiments, other records may be stored in warehoused data 196, including at least records representing data other that customer information.

Many alternatives to the FIG. 3 process steps may be employed in accordance with the present invention. In some embodiments, a distribution of difference values is examined after step S308 to determine whether steps S305 to S308 should be repeated using more, less, or otherwise different by-group variables. Moreover, the first threshold value and the second threshold value may be determined based on the distribution.

Figure 13:
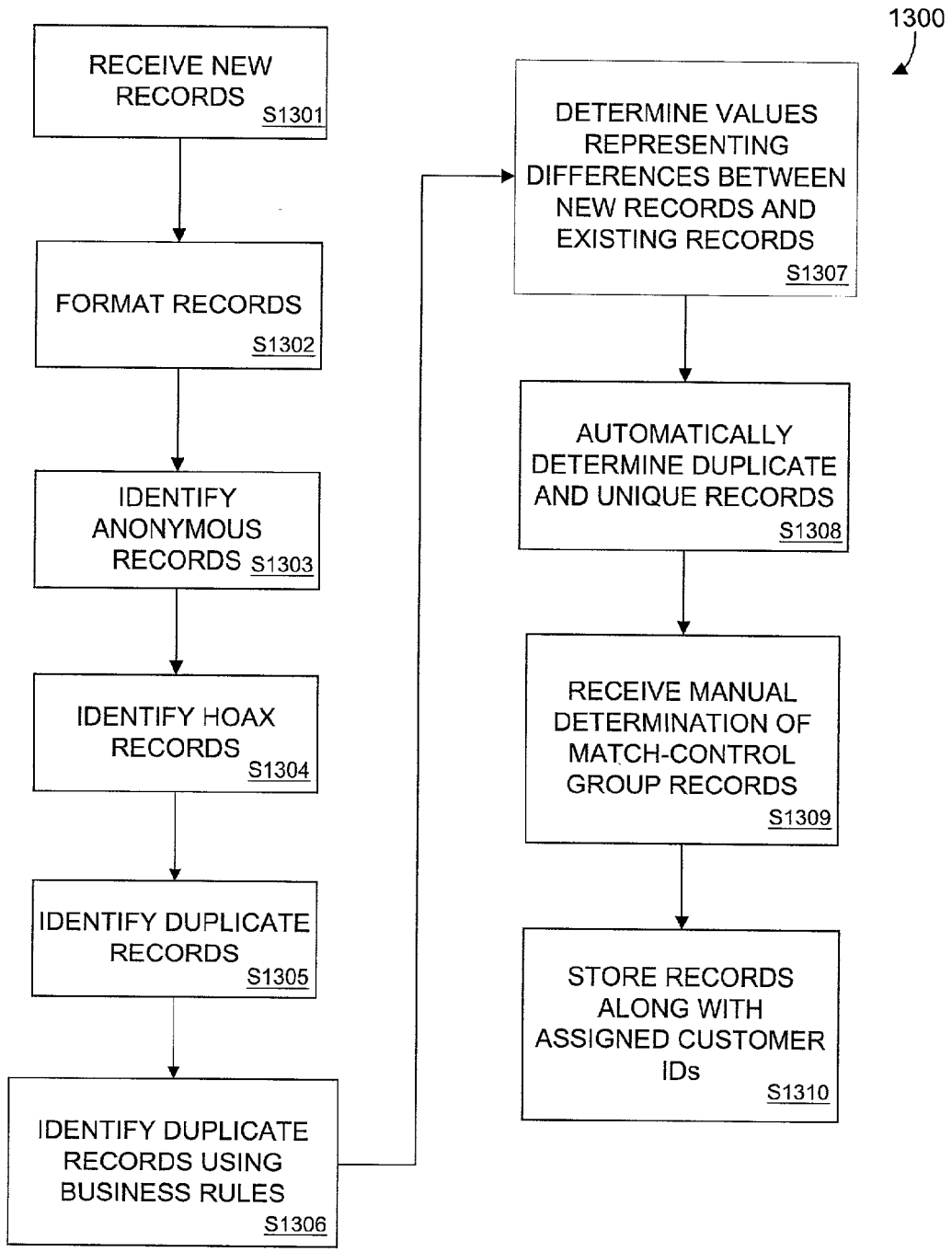
FIG. 13 illustrates a flow diagram of process steps to provide deduplication according to some embodiments of the invention.

Process steps 1300 of FIG. 13 may be used to perform an ongoing load of new data into warehoused data 196. Specifically, process steps 1300 may be executed by microprocessors 110 to determine whether new records include records that are duplicates of existing warehoused records and to store the new records along with the existing warehoused records based on the determination.

Process steps 1300 therefore provide for reception of a plurality of new records, determination of values representing differences between a new record and one or more of the existing records for each of the plurality of new records, identification of at least one of the plurality of new records and one of the existing records as duplicates based on a determined value representing a difference between the two records, and storage of at least one of the plurality of new records in the data warehouse in association with an identifier identical to an identifier associated with the one of the existing records.

Initially, at step S1301, new records are received. The new records may be received from any of the sources that were described above with respect to step S301. Similarly, flow proceeds from step S1302 through step S1306 as also described above to format the received records, to identify anonymous records, to identify hoax records, to identify identical records, and to identify duplicate records using business rules according to steps S302 to S305 and S307. It should be noted that steps S1302 through S1306 are not required to mimic steps S302 to S305 and S307 exactly, and may differ substantially therefrom. Moreover, new records may be stored with existing records according to embodiments of the invention without performing some or all of steps S1302 through S1306.

FIG. 14 illustrates received new records processed according to steps S1302 through S1306. The records are illustrated in tabular form as stored in new data 194. In step S1307, difference values representing differences between the received new records and existing records of warehoused data 196 are determined. The difference values may be determined using by-groups as described with respect to process steps 900. More specifically, the new records and the records of warehoused data 196 may be sorted into by-groups based on by-group fields, with the determined difference values only representing differences between two records of a same by-group.

Alternatively, difference values representing differences between each new record and each record of warehoused data 196 may be determined in step S1307. Such an alternative may be desirable if a number of new records is small, or for other reasons. FIG. 15 is a table similar to the table of FIG. 10, showing difference values corresponding to pairs of records in a case that values representing differences between each new record and each record of warehoused data 196 are determined in step S1307.

Based on the determined difference values, and using the previously-mentioned threshold values of 17 and 40, it is determined that records "X440" and "9400" are duplicates, and a match-control group includes the pairs of records "X439" and "HJ2", "X439" and "3", "X440" and "HJ2", "X440&9400", "X440" and "3", and "2-195" and "01101". Accordingly, in step S1309, it is determined whether the pairs of the match-control group represent unique or duplicate records.

Figure 16:
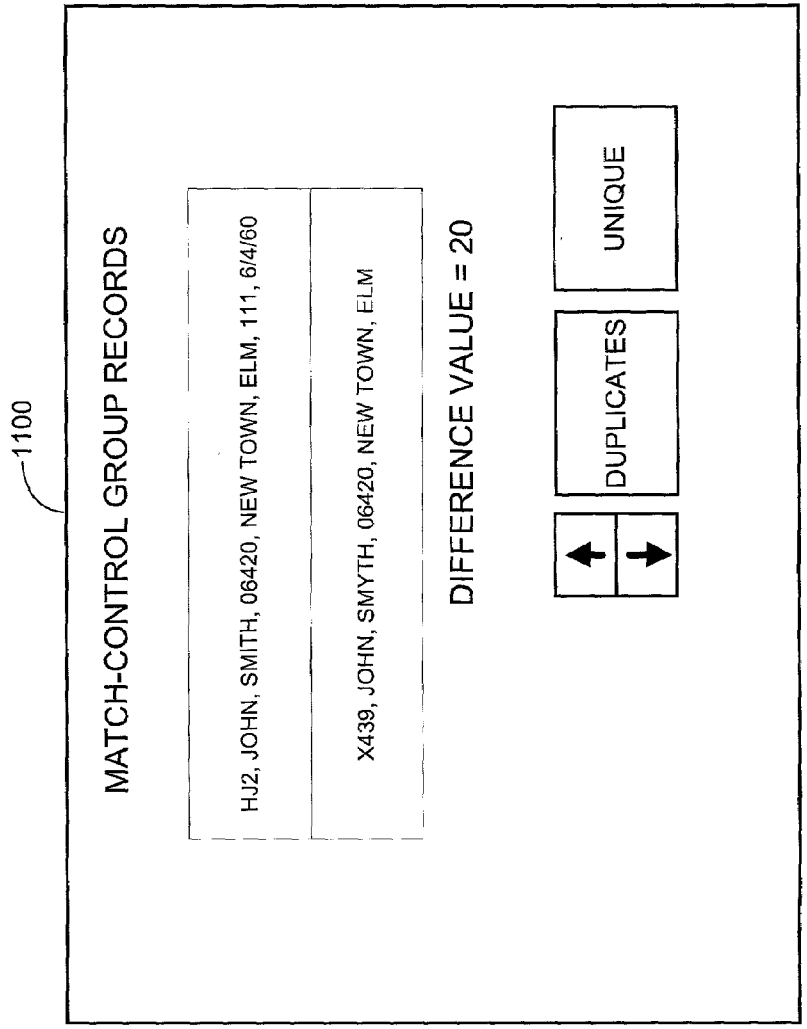
FIG. 16 is an outward view of an interface for manually identifying duplicate records of a match-control group during loading of data into existing warehoused data according to some embodiments of the present invention.

The determination of step S1309 may be received via interface 1100 of FIG. 16. As shown, interface 1100 accepts input from an operator that indicates whether a pair of records are unique to each other or are duplicates. For the present example, it will be assumed that pairs "X439" and "HJ2", "X439" and "3", "X440" and "HJ2", "X440" and "3", and "2-195" and "01101" include duplicate records. As a result, records "X439" and "X440" are assigned customer ID "01-001" and record "2-195" is assigned customer ID "01-003".

In step S1310, the new records are stored in warehoused data 196 in association with their assigned customer IDs. FIG. 17 illustrates warehoused data 196 after step S1310 of the present example. It should be noted that either of the FIG. 3 or the FIG. 13 process steps may be used to process records already associated with a customer ID. In such cases, one or more of the processed records may be assigned a new customer ID after completion of the steps.

ID journal table 198 of FIG. 18 may be used to track possible changes made to customer ID fields 501 of warehoused data 196 of FIG. 17 after subsequent deduplication processes. For example, record 1801 specifies that a customer ID associated with record number "X440" in warehoused data 196 was changed from "01-001" to "01-002" because the record was determined to be a duplicate of record number "9400". Additionally, record 1802 indicates that records associated with customer ID "01-004" were changed so as to be associated with customer ID "01-001". Record 1803, on the other hand, indicates that a customer ID associated with record number "2-195" in warehoused data 196 was changed from "01-003" to "01-005" because the record was no longer determined to be a duplicate of the other records associated with customer ID "01-003". Of course, customer ID fields 501 associated with the records identified in ID journal table 198 are changed based on the changes specified in table 198. ID journal table 198 thereby allows data warehouse 100 to maintain a history of customer IDs associated with various records.

The process steps of FIG. 3, FIG. 9, and/or FIG. 13 may be altered to create embodiments of the invention different from or according to any of the arrangements mentioned herein. The processes described herein may be used to determine duplicate records that represent subjects or entities other than customers. For example, two records representing a same purchase but including different specific data may be identified as duplicate records. Accordingly, duplicate records in the context of the present application are records that refer to the same subject of interest, such as a same account, supplier, contract, etc.

The deduplication processes described herein may also be applied to define a categorical cluster analysis, where simple text patterns define a cluster structure and a cluster comprises an ID group. The processes may also be used to compare sample text with correctly-spelled reference text such as surnames and town names stored in a private or public table. If a difference value representing a difference between the sample text and one of the reference text is less than a threshold amount, the sample text is replaced with the reference text. As a result, the processes provide spell-checking functions. It should be noted that this type of spell-checking may also be used in steps S302 and S1302 to format a data record.

It is contemplated that new data 194, warehoused data 196 and journal ID table 198 may include many more records than those shown and that each record may include associated fields other than those illustrated. It should also be noted that the tabular illustration and accompanying description merely represent relationships between stored information. A number of other arrangements may be employed besides the one suggested.

Moreover, although the present invention has been described with respect to particular embodiments and alternative arrangements thereof, those skilled in the art will note that various substitutions may be made to those embodiments and arrangements without departing from the spirit and scope of the present invention.

What is claimed is:

1. A method for determining a value representing a difference between a first record comprising a first plurality of data fields and a second record comprising a second plurality of data fields, each of the first plurality of data fields corresponding to a respective one of the second plurality of data fields, the method comprising:

for each of the first plurality of data fields, determining a first value representing a difference between data specified in the data field and data specified in a respective one of the second plurality of data fields;

for each of the second plurality of data fields, determining a second value representing a difference between data specified in the data field and data specified in a respective one of the first plurality of data fields;

determining a third value representing a difference between the first record and the second record based on the determined first and second values; and identifying whether the first and second records are duplicates based on the determined third value, wherein the determining and identifying is provided by a processor;

wherein the determining of the third value comprises:

determining a sum of the determined first values and the determined second values; and dividing the sum by two.

2. An apparatus according to claim 1, wherein the instructions to determine the first value and the instructions to determine the second value comprise identical steps performed with respect to different inputs.

3. An apparatus according to claim 1, wherein the first plurality of data fields and the second plurality of data fields include only those fields of the first record and the second record that specify data that is not identical to data specified in a respective field.

4. A method for determining a value representing a difference between a first record comprising a first plurality of data fields and a second record comprising a second plurality of data fields, each of the first plurality of data fields corresponding to a respective one of the second plurality of date fields, the method comprising:

for each of the first plurality of data fields, determining a first value representing a difference between data specified in the data field and data specified in a respective one of the second plurality of data fields;

for each of the second plurality of data fields, determining a second value representing a difference between data specified in the data field and data specified in a respective one of the first plurality of data fields;

determining a third value representing a difference between the first record and the second record based on the determined first and second values; and identifying whether the first and second records are duplicates based on the determined third value, wherein the determining and identifying is provided by a processor, wherein the determining of the first value comprises:

determining an asymmetric spelling distance as a normalized cost for converting first input data to second input data via a sequence of operations; and wherein the step of determining the second value comprises:

determining an asymmetric spelling distance as a normalized cost for converting second input data to first input data via the sequence of operations.

5. A method according to claim 4, wherein the step of determining the third value comprises:

determining, for each of the first plurality of data fields and respective ones of the second plurality of data fields, a fourth value based on a mean of a first value determined for one of the first plurality of data fields and a second value determined for a respective one of the second plurality of data fields; and summing the determined fourth values.

6. A method according to claim 4, wherein the determining of the first value and the determining of the second value comprise identical operations performed with respect to different inputs.

7. A method according to claim 4, wherein, in the determining of the first value, the first input data is data specified in one of the first plurality of data fields and the second input data is data specified in a respective one of the second plurality of data fields, and wherein, in the determining of the second value, the first input data is data specified in one of the second plurality of data fields and the second input data is data specified in a respective one of the first plurality of data fields.

8. A method according to claim 4, further comprising:

converting numerical data specified in the one or more of the first plurality of data fields and the second plurailty of data fields to text data.

9. A method according to claim 4, wherein the first plurality of data fields and the second plurality of data fields include only those fields of the first record and the second record that specify data that is not identical to data specified in a respective field.

10. An apparatus storing processor-executable instructions thereon to determine a value representing a difference between a first record comprising a first plurality of data fields and a second record comprising a second plurality of data fields, each of the first plurality of data fields corresponding to a respective one of the second plurality of data fields, the instructions comprising:

instructions to determine, for each of the first plurality of data fields, a first value representing a difference between data specified in the data field and data specified in a respective one of the second plurality of data fields;

instructions to determine, for each of the second plurality of data fields, a second value representing a difference between data specified in the data field and data specified in a respective one of the first plurality of data fields;

instructions to determine a third value representing a difference between the first record and the second record based on the determined first and second values; and instructions to identify whether the first and second records are duplicates based on the determined third value, wherein the instructions determine the first value comprises:

instructions to determine an asymmetric spelling distance as a normalized cost for converting first input data to second input data via a sequence of operations; and wherein the instructions to determine the second value comprises:

instructions to determine an asymmetric spelling distance as a normalized cost for converting second input data to first input data via the sequence of operations.

11. An apparatus according to claim 10, wherein, in the instructions to determine the first value, the first input data is data specified in one of the first plurality of data fields and the second input data is data specified in a respective one of the second plurality of data fields, and wherein, in the instructions to determine the second value, the first input data is data specified in one of the second plurality of data fields and the second input data is data specified in a respective one of the first plurality of data fields.

12. A data warehouse comprising:

a processor; and a storage device in communication with the processor and storing instructions adapted to be executed by the processor to:

determine, for each of a first plurality of data fields of a first record, a first value representing a difference between data specified in the data field and data specified in a respective one of a second plurality of data fields of a second record, determine, for each of the second plurality of data fields, a second value representing a difference between data specified in the data field and data specified in a respective one of the first plurality of data fields, determine a third value representing a difference between the first record and the second record based on the determined first and second values; and identify whether the first and second records are duplicates based on the determined third value, wherein the instructions adapted to be executed by the processor to determine the first value comprise instructions adapted to be executed by the processor to:

determine an asymmetric spelling distance as a normalized cost for converting first input data to second input data via a sequence of operations; and wherein the instructions adapted to be executed by the processor to determine the second value comprise instructions adapted to be executed by the processor to: determine an asymmetric spelling distance as a normalized cost for converting the second input data to the first input data via the sequence of operations.

13. A data warehouse according to claim 12, wherein the instructions adapted to be executed by the processor to determine the first value and to determine the second value comprise identical steps performed with respect to different inputs.

* * * * *